US011775897B2

(12) United States Patent
Yildirmaz et al.

(10) Patent No.: US 11,775,897 B2
(45) Date of Patent: Oct. 3, 2023

(54) PREDICTIVE MODELING METHOD AND SYSTEM FOR DYNAMICALLY QUANTIFYING EMPLOYEE GROWTH OPPORTUNITY

(71) Applicant: ADP, Inc., Roseland, NJ (US)

(72) Inventors: Zahide Ahu Yildirmaz, Roseland, NJ (US); Dante DeAntonio, Roseland, NJ (US); Christopher Ryan, Louisville, KY (US); Xhevdet Nezaj, Roseland, NJ (US)

(73) Assignee: ADP, INC., Roseland, NJ (US)

( * ) Notice: Subject to any disclaimer, the term of this patent is extended or adjusted under 35 U.S.C. 154(b) by 314 days.

(21) Appl. No.: 16/459,821

(22) Filed: Jul. 2, 2019

(65) Prior Publication Data

US 2021/0004745 A1 Jan. 7, 2021

(51) Int. Cl.
| | | |
|---|---|---|
| *G06Q 10/00* | (2023.01) | |
| *G06Q 10/0631* | (2023.01) | |
| *G06N 5/02* | (2023.01) | |
| *G06Q 10/04* | (2023.01) | |

(52) U.S. Cl.
CPC ......... *G06Q 10/06315* (2013.01); *G06N 5/02* (2013.01); *G06Q 10/04* (2013.01)

(58) Field of Classification Search
None
See application file for complete search history.

(56) References Cited

U.S. PATENT DOCUMENTS

| 7,584,117 | B2 | 9/2009 | Bubner | |
|---|---|---|---|---|
| 11,227,047 | B1* | 1/2022 | Vashisht | G06F 21/552 |
| 2006/0122918 | A1* | 6/2006 | Graboske | G06Q 50/16 |
| | | | | 705/30 |
| 2006/0235742 | A1* | 10/2006 | Castellanos | G06Q 30/0201 |
| | | | | 705/7.29 |
| 2011/0270779 | A1* | 11/2011 | Showalter | G06Q 40/06 |
| | | | | 705/36 R |

(Continued)

OTHER PUBLICATIONS

AGCA: Construction jobs grow, but Trump spending would be nice, by Paul Brinkmann Nov. 29, 2016, http://www.orlandosentinel.com/business/os-construction-jobs-trump-20161129-story.html (Year: 2016).*

(Continued)

*Primary Examiner* — Rutao Wu
*Assistant Examiner* — Scott M Ross
(74) *Attorney, Agent, or Firm* — Foley & Lardner LLP

(57) ABSTRACT

A method, computer system, and computer program product that aggregates sample data regarding a plurality of factors associated with work scheduling, employee compensation, and employee turnover; performs iterative analysis on the sample data using machine learning to construct a predictive model; populates, using the predictive model, a database with predicted values of employee turnover in relation to work scheduling and employee compensation; converts the predicted values of employee turnover in the database into percentages of observed values of employee turnover for a selected group of employers over a specified time period to create indices of employee turnover; and rank orders the selected employers according to their indices of employee turnover.

20 Claims, 8 Drawing Sheets

(56) References Cited

U.S. PATENT DOCUMENTS

| | | | | |
|---|---|---|---|---|
| 2013/0030862 | A1* | 1/2013 | Civil | G05B 19/042 |
| | | | | 705/7.29 |
| 2015/0269244 | A1* | 9/2015 | Qamar | G06Q 10/06398 |
| | | | | 705/7.42 |
| 2019/0102693 | A1* | 4/2019 | Yates | G06N 5/003 |
| 2020/0081991 | A1* | 3/2020 | Caputo | G06F 16/215 |

OTHER PUBLICATIONS

"Year on year change and average" Publication date: Oct. 13, 2016, https://www.insee.fr/en/metadonnees/definition/c1373 (Year: 2016).*

"Understanding 8 types of Cross-Validation: A Deep dive explanation of cross validation and its types," Satyam Kumar, Sep. 13, 2020, Towards Data Science (Year: 2020).*

Saporta et al., "The Relationship Between Actual Promotion and Turnover Among Professional and Managerial-Administrative Occupational Groups," Work and Occupations, vol. 30, No. 3, Aug. 2003, pp. 255-280.

Fields, "Predicting Potential for Promotion: How the Data in Human Resource Information Systems Can Be Used to Help Organizations Gain Competitive Advantage," CAHRS Working Paper #02-14, Cornell University, School of Industrial and Labor Relations, Center for Advanced Human Resource Studies, Jul. 2002, Ithaca, New York, 35 pages.

Böhm et al., "The Business Model DNA: Towards an Approach for Predicting Business Model Success," 13th International Conference on Wirtschaftsinformatik, Feb. 12-15, 2017, St. Gallen, Switzerland, 15 pages.

* cited by examiner

| | INDEPENDENT VARIABLES (X) | DEPENDENT VARIABLES (Y) |
|---|---|---|
| ROW 1 | | |
| ROW 2 | | |
| ROW 3 | | |
| ROW 4 | | |

| INDUSTRY | MANAGER/ EMPLOYEE RATIO | PROMOTION RATE | EMPLOYMENT GROWTH | GROWTH POTENTIAL INDEX | GROWTH POTENTIAL INDEX (US=100) |
|---|---|---|---|---|---|
| TOTAL PRIVATE | 13.5% | 7.6% | 4.0% | 0.00 | 100.00 |
| INFORMATION | 16.9% | 11.0% | 6.4% | 1.79 | 278.84 |
| FINANCE | 17.4% | 10.3% | 3.8% | 0.90 | 190.49 |
| PROFESSIONAL/BUSINESS SERVICES | 14.6% | 8.7% | 5.1% | 0.68 | 167.88 |
| MANUFACTURING | 13.9% | 10.2% | 3.7% | 0.46 | 145.58 |
| CONSTRUCTION | 14.4% | 9.5% | 3.7% | 0.39 | 138.54 |
| TRADE | 12.5% | 8.7% | 3.7% | 0.02 | 101.81 |
| EDUCATION/HEALTH | 11.1% | 7.7% | 3.0% | -0.58 | 42.31 |
| LEISURE/HOSPITALITY | 8.6% | 5.8% | 4.5% | -0.78 | 21.99 |
| AVERAGE | 13.5% | 7.6% | 4.0% |  |  |
| STANDARD-DEVIATION | 2.9% | 1.7% | 1.1% |  |  |

FIG. 7

| DEPENDENT VARIABLE: VOLUNTARY TURNOVER | | | |
|---|---|---|---|
|  | COEFFICIENTS | STANDARD ERROR | P-VALUE |
| INTERCEPT | -0.304 | 0.014 | 0.000 |
| MANAGER/EMPLOYEE RATIO | -0.123 | 0.011 | 0.000 |
| PROMOTION RATE | -0.142 | 0.011 | 0.000 |
| EMPLOYMENT GROWTH | -0.068 | 0.011 | 0.000 |
| OBSERVATIONS = 8,576 FIRMS R-SQUARED = 0.04 | | | |

FIG. 8

PREDICTIVE MODELING METHOD AND SYSTEM FOR DYNAMICALLY QUANTIFYING EMPLOYEE GROWTH OPPORTUNITY

BACKGROUND INFORMATION

1. Field

The present disclosure relates generally to an improved computer system and, in particular, to a method and apparatus for machine learning predictive modeling. Still more particularly, the present disclosure relates to a method and apparatus for measuring and quantifying metrics which convey employee growth opportunity within a firm.

2. Background

What is the fundamental value of a promotion? At its deepest level, promotions are core to the theory of "Human Capital", a term first used by Nobel Prize-winning economist Gary Becker. The theory of Human Capital explains, among other things, why employees may seem to be "underpaid" early in their careers while acquiring critical skills while they may seemingly be "overpaid" later on in their careers due to possession of proprietary knowledge and capabilities. Interestingly, Becker suggested that specific work experience and on-the-job training within a company were often more valuable, and more likely to be rewarded with differential pay than formal education. In that respect, a high number of internal promotions suggests a company may be achieving a higher return on investment in its human capital.

A company that is achieving employee retention goals would likely see overall quantitative characteristics of:
Higher overall growth
More consistent and profitable performance
Happier employees
Lower turnover
A pattern of increased pay per year of employee tenure
Higher overall value creation, in terms of total profitability, payroll contributions, and perceived customer value.

Therefore, it would be desirable to have a method and system that provide predictive modeling and indices that allow for reducing voluntary turnover within a firm by measuring and quantifying metrics which convey employee growth opportunity.

SUMMARY

An embodiment of the present disclosure provides a computer-implemented method for predictive modeling. The computer system aggregates sample data regarding a plurality of metrics associated with employee growth opportunity and voluntary employee turnover and performs iterative analysis on the sample data using machine learning to construct a predictive model. The computer system then populates, using the predictive model, a database with predicted values of voluntary employee turnover in relation to employee growth opportunity. The computer system converts the predicted values of voluntary employee turnover in the database into percentages of observed values of voluntary employee turnover for a selected group of employers over a specified time period to create indices of voluntary employee turnover. The computer system then rank orders the selected employers according to their indices of voluntary employee turnover.

Another embodiment of the present disclosure provides a machine learning predictive modeling system comprising a computer system and one or more processors running on the computer system. The one or more processors aggregate sample data regarding a plurality of metrics associated with employee growth opportunity and voluntary employee turnover and performs iterative analysis on the sample data using machine learning to construct a predictive model; populate, using the predictive model, a database with predicted values of voluntary employee turnover in relation to employee growth opportunity; convert the predicted values of voluntary employee turnover in the database into percentages of observed values of voluntary employee turnover for a selected group of employers over a specified time period to create indices of voluntary employee turnover; rank orders the selected employers according to their indices of voluntary employee turnover.

Yet another embodiment of the present disclosure provides a computer program product for machine learning predictive modeling comprising a non-transitory computer-readable storage media having program code stored thereon. The program code comprises program code, stored on the computer-readable storage media, for aggregating sample data regarding a plurality of metrics associated with employee growth opportunity and voluntary employee turnover and performs iterative analysis on the sample data using machine learning to construct a predictive model; program code, stored on the computer-readable storage media, for populating, using the predictive model, a database with predicted values of voluntary employee turnover in relation to employee growth opportunity; program code, stored on the computer-readable storage media, for converting the predicted values of voluntary employee turnover in the database into percentages of observed values of voluntary employee turnover for a selected group of employers over a specified time period to create indices of voluntary employee turnover; program code, stored on the computer-readable storage media, for the selected employers according to their indices of voluntary employee turnover.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an example of an initial index developed from the raw metrics by standardizing the values and applying equal weights in accordance with an illustrative embodiment;

FIG. 8 is an example of a linear regression model wherein standardized values for different opportunity metrics are included as independent variables in accordance with an illustrative embodiment;

DETAILED DESCRIPTION

Figure 1:
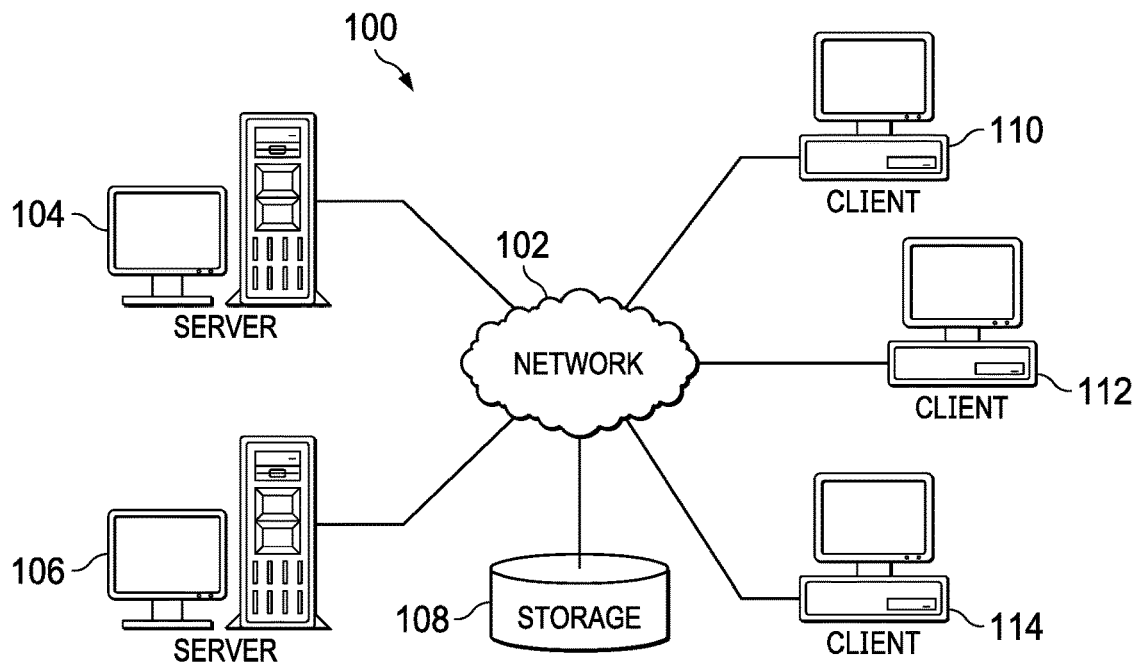
FIG. 1 is an illustration of a diagram of a data processing environment in accordance with an illustrative embodiment.

The illustrative embodiments recognize and take into account one or more different considerations. For example, the illustrative embodiments recognize and take into account that, when an employee is promoted, whether an individual is promoted internally, or hired from outside the firm, there are a number of characteristic behaviors that often accompany the promotion. These behaviors, in and of themselves, may also have a direct impact on the relationship between promotions and turnover.

The illustrative embodiments further recognize and take into account that promotional activities, when performed correctly, benefit not only the recipient but also the entire organization. The employer benefits by acquiring a leader who possesses critical knowledge of the organization's people, internal processes, values, and culture, and does not need to acquire these additional abilities on the job. The employer also achieves a return on investment in training, development, and mentoring. Preservation of knowledge, enhancement of teamwork and a more consistent work environment, in turn, may create a better place to work for all employees.

Thus, a method and apparatus that would allow for accurately measuring and quantifying the metrics within a firm which convey opportunity to employees and, therefore, work to reduce voluntary turnover would fill a long-felt need in the field of business management and employee benefits analysis.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
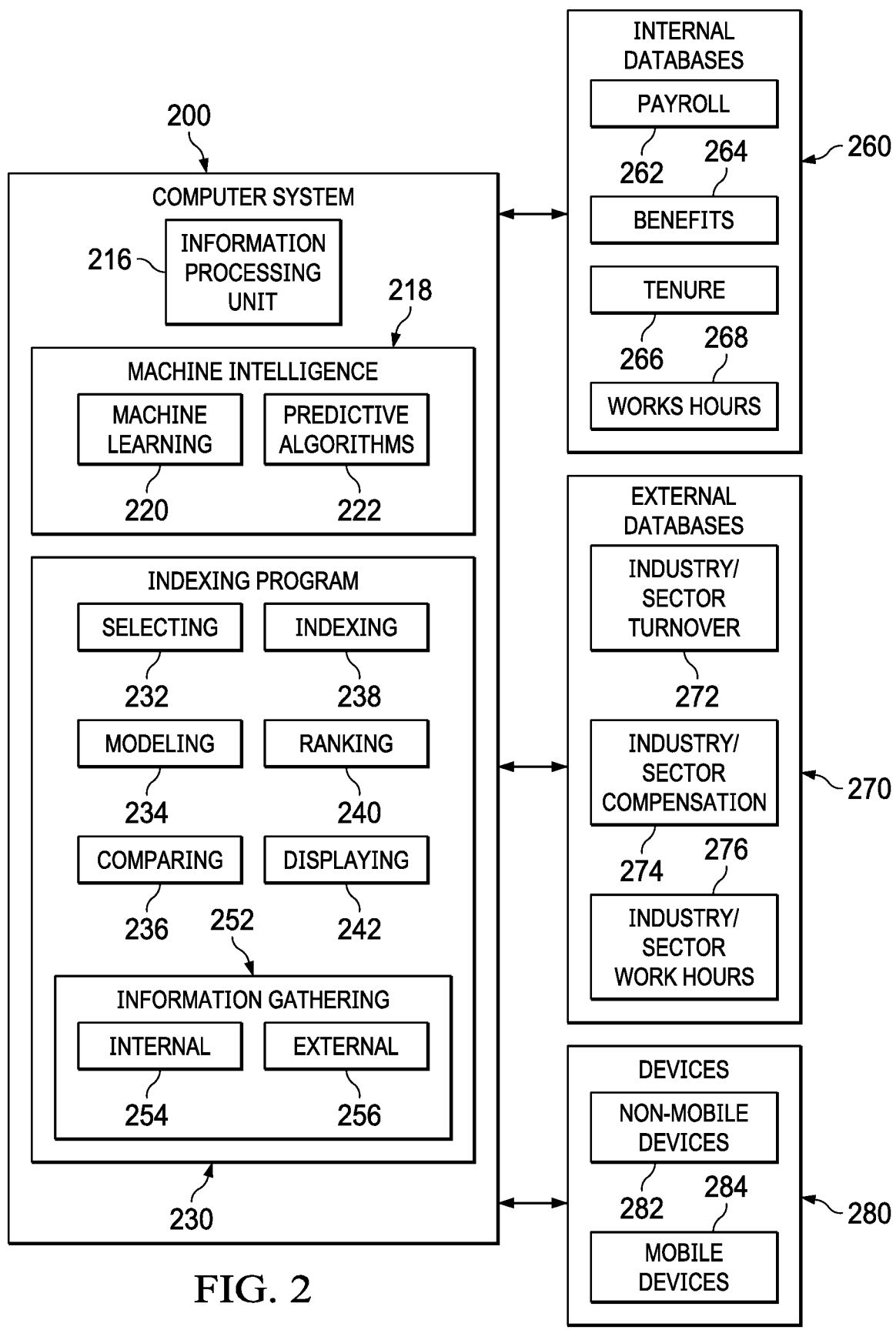
FIG. 2 is an illustration of a block diagram of a computer system for predictive modeling in accordance with an illustrative embodiment.

Turning to FIG. 2, a block diagram of a computer system for predictive modeling is depicted in accordance with an illustrative embodiment. Computer system 200 is connected to internal databases 260, external databases 270, and devices 280. Internal databases 260 comprise payroll 262, benefits 264, employee turnover records 266, and work hours 268. External databases 270 comprise industry/sector employee turnover databases 272, industry/sector compensation databases 274, and industry/sector work hours databases 276. Devices 280 comprise non-mobile devices 282 and mobile devices 284.

Computer system 200 comprises information processing unit 216, machine intelligence 218, and indexing program 230. Machine intelligence 218 comprises machine learning 220 and predictive algorithms 222.

Machine intelligence 218 can be implemented using one or more systems such as an artificial intelligence system, a neural network, a Bayesian network, an expert system, a fuzzy logic system, a genetic algorithm, or other suitable types of systems. Machine learning 220 and predictive algorithms 222 may make computer system 200 a special purpose computer for dynamic predictive modeling of employee satisfaction and retention.

In an embodiment, information processing unit 216 comprises one or more conventional general purpose central processing units (CPUs). In an alternate embodiment, information processing unit 216 comprises one or more graphical processing units (GPUs). Though originally designed to accelerate the creation of images with millions of pixels whose frames need to be continually recalculated to display output in less than a second, GPUs are particularly well-suited to machine learning. Their specialized parallel processing architecture allows them to perform many more floating point operations per second than a CPU, on the order of 1000× more. GPUs can be clustered together to run neural networks comprising hundreds of millions of connection nodes.

Indexing program 230 comprises information gathering 252, selecting 232, modeling 234, comparing 236, indexing 238, ranking 240, and displaying 242. Information gathering 252 comprises internal 254 and external 256. Internal 254 is configured to gather data from internal databases 260. External 256 is configured to gather data from external databases 270.

Thus, information processing unit 216, machine intelligence 218, and indexing program 230 transform a computer system into a special purpose computer system as compared to currently available general computer systems that do not have a means to perform machine learning predictive modeling such as computer system 200 of FIG. 2. Currently used general computer systems do not have a means to accurately predict and compare employee satisfaction and retention.

Figure 3:
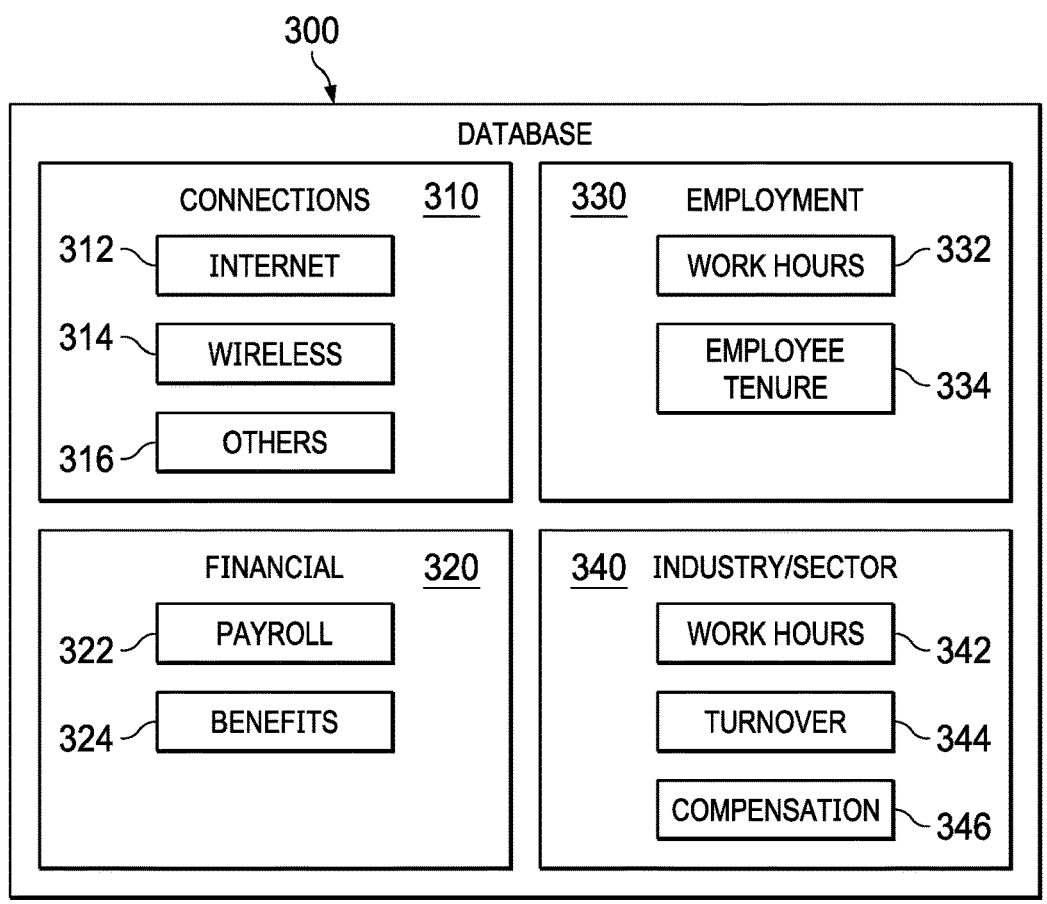
FIG. 3 is an illustration of a database for access by a predictive modeling application in accordance with an illustrative embodiment.

Turning to FIG. 3, a block diagram of a database is depicted in accordance with an illustrative embodiment. Database 300 comprises connections 310, financial data 320, employment data 330, and industry/sector data 340. Connections 310 comprise internet 312, wireless 314, and others 316. Connections 310 may provide connectivity with internal databases 260, external databases 270, and devices 280 shown in FIG. 2. Internet 312 and wireless 314 as well as others 316 in connections 310 in FIG. 3 may connect with internal databases 260, external databases 270, and devices 280, shown in FIG. 2, through a network such as network 102 in FIG. 1. Others 316 may comprise any additional available means of connection other than internet 312 and wireless 314 such as a hard wired connection or a landline.

In an illustrative embodiment, financial data 320 comprises the employee compensation package. Information regarding employee salaries is maintained in payroll 322. Information regarding employee benefits is maintained in benefits 324.

Employment data 330 contains employer workforce information. Information regarding the employee work hours is maintained in work hours 332. Information about employee turnover and retention is maintained in turnover 334.

Industry/sector data 340 comprises information about general practices within the employer's industry/sector and/ or information about the employer's practices in other industries/sectors. A sector identifies a high-level group of related businesses. It can be thought of as a generic type of business. For example, the North American Industry Classification System (NAICS) uses a six digit code to identify an industry. The first two digits of that code identify the sector in which the industry belongs. Information regarding work hours and changes in work hours within an industry/sector is maintained in work hours 342. Information regarding employee retention within an industry/sector is maintained in turnover 344. Information regarding compensation packages within an industry/sector, including salary and benefits, is maintained in compensation 346.

Figures 4, 6:
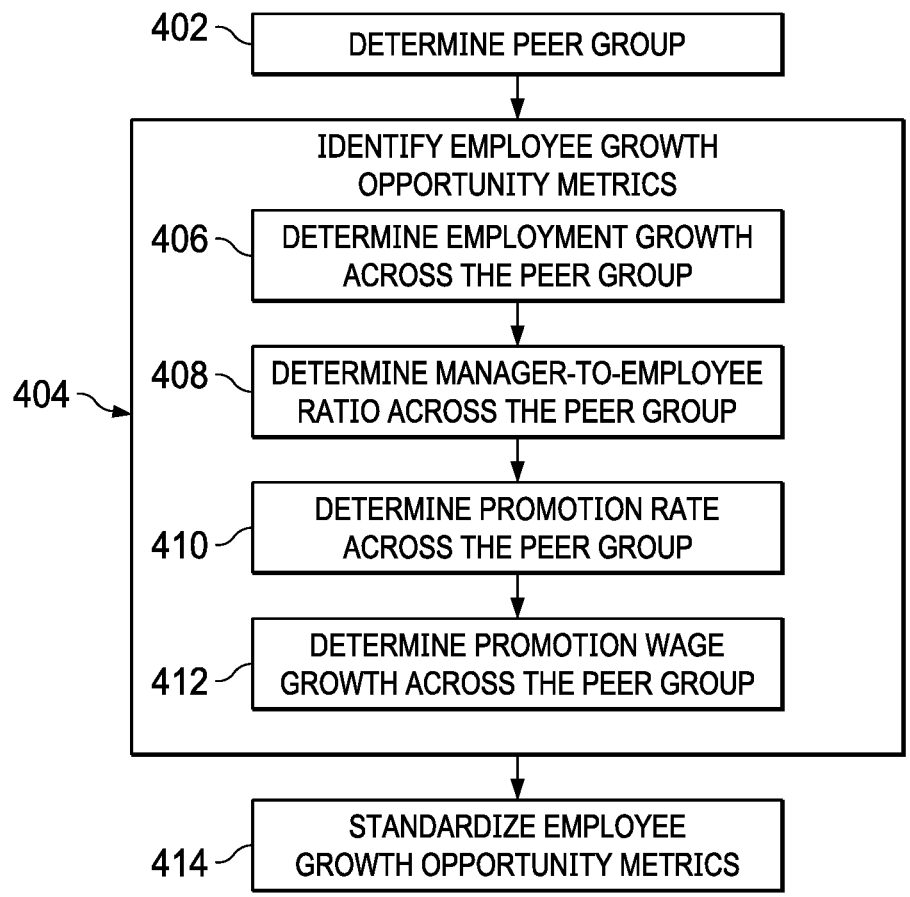
FIG. 4 is an illustration of a flowchart of a process for calculating factors used in predictive modeling in accordance with an illustrative embodiment.
FIG. 6 is an example table for use with a dataset in machine learning in accordance with an illustrative embodiment.

Turning to FIG. 4, an illustration of a flowchart for calculating factors used in predictive modeling is depicted in accordance with an illustrative embodiment. This process can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, the process can be implemented by data processing system 1200 in FIG. 12 and a processing unit such as processor unit 1204 in FIG. 12.

It should be emphasized that the specific sequence of steps in the illustrative embodiment shown in FIG. 4 is chosen merely for convenience. The factors shown in FIG. 4 can be calculated independently in other orders or may be calculated in parallel by separate processors or processor threads, depending on the specific architecture of the computer system used. In the illustrative embodiment the factors are calculated using the information maintained in database 300 shown in FIG. 3.

The process begins by determining a peer group of an employer (step 402). Next, the process identifies a plurality of metrics associated with employee growth opportunity (step 404).

In one illustrative example, as part of identifying a plurality of metrics associated with employee growth opportunity, the process determines employment growth across the peer group (step 406). Employment growth is the year-over-year change in employment across the selected peer group. Employment growth can fluctuate due to the influence of a variety of factors related to employee growth opportunity. For example, a downturn or upturn in an industry will change the employment growth within the selected peer group. For example, a supply of qualified candidates that is greater than the number of job openings can negatively impact employee growth opportunity within the peer group. Likewise, fewer qualified applicants can positively impact employee growth opportunity within the peer group.

In one illustrative example, as part of identifying a plurality of metrics associated with employee growth opportunity, the process determines a manager-to-employee ratio across the peer group (step 408). The manager-to-employee ratio is the total count of workers identified as managers as a share of the firm's total workforce. A high span of control may correlate to fewer opportunities. Therefore, the number of open supervisory jobs that are available versus direct reports, or lower hierarchy jobs, may be indicative of employee growth opportunity within the peer group.

In one illustrative example, as part of identifying a plurality of metrics associated with employee growth opportunity, the process determines a promotion rate across the peer group (step 410). The promotion rate is the number of employees given a promotion over the previous year as a share of the total workforce for the selected peer group. If there are a lot of good positions to apply for, with good financial rewards, there is good "opportunity" within the peer group. If the peer group or industry is growing, employee growth opportunities are also likely to increase across the peer group.

In one illustrative example, as part of identifying a plurality of metrics associated with employee growth opportunity, the process determines promotion wage growth across the peer group (step 412). The promotion wage growth is the average percentage wage increase for workers earning a promotion in the previous year. A higher average wage increase may be indicative of employee growth opportunity within the peer group.

Each of the metrics of employee growth opportunity is standardized (step 414), giving them equal weight in the calculation of the index. Without standardization, the relative importance of each metric in the final index would be based in part on the mean and variance of each variable. To avoid this, each of the included metrics are converted to z-scores at either the industry or firm level prior to the calculation of the index as:

$$z_{ij} = \frac{x_{ij} - \overline{x_j}}{s_j} \quad \text{Equation 1}$$

wherein:

$z_{ij}$ is the new standardized value of variable x for industry/firm i and metric j;

$x_{ij}$ is the original value for industry/firm i and metric j;

$\overline{x_j}$ is the average value of metric j; and $s_j$ is the sample standard deviation for metric j.

The method of the present disclosure utilizes machine learning and predictive algorithms such as those provided by machine intelligence 218 in FIG. 2. Machine learning is a branch of artificial intelligence (AI) that enables computers to detect patterns and improve performance without direct programming commands. Rather than relying on direct input commands to complete a task, machine learning relies on input data. The data is fed into the machine, a predictive algorithm is selected, parameters for the data are configured, and the machine is instructed to find patterns in the input data through trial and error. The data model formed from analyzing the data is then used to predict future values.

Figure 5:
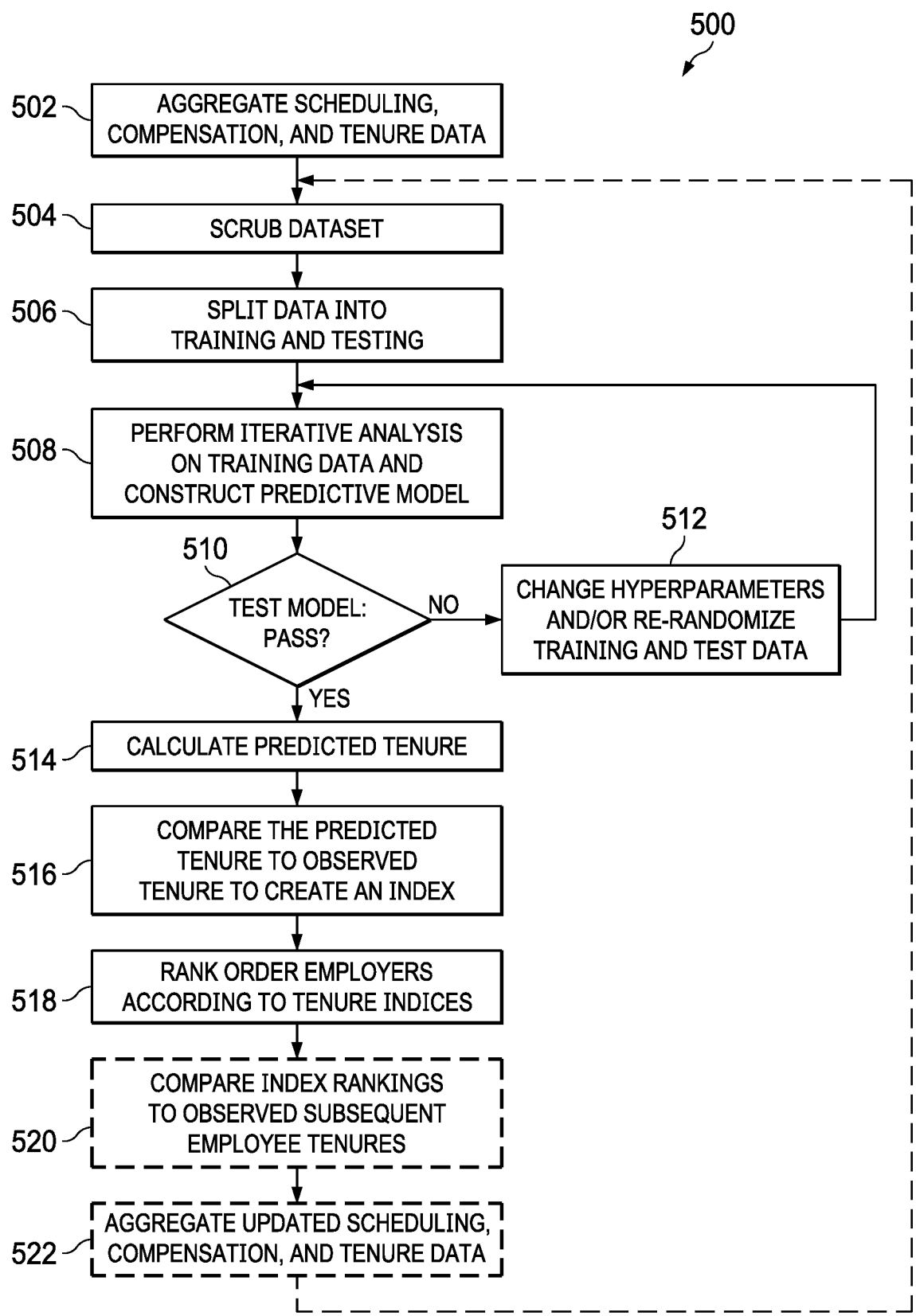
FIG. 5 is an illustration of a flowchart of a process for predictive modeling and indexing in accordance with an illustrative embodiment.

Turning to FIG. 5, an illustration of a flowchart of a process for predictive modeling and indexing is depicted in accordance with an illustrative embodiment. Process 500 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, the process can be implemented by data processing system 1200 in FIG. 12 and a processing unit such as processor unit 1204 in FIG. 12.

Process 500 begins by aggregating an employee growth opportunity and voluntary employee turnover data associated with factors determined in the process flow in FIG. 4 (step 502). Referring to FIG. 6, an example table for use with a dataset in machine learning is depicted in accordance with an illustrative embodiment. The dataset used to form predictions is defined and labeled in a table such as table 600. Each column is known as a vector, and the data within each column is a feature, also known as a variable, dimension, or attribute. Each row represents a single observation of a given feature and is referred to as a case or value. The y values represent the output and are typically expressed in the final column as shown. For ease of illustration, the example shown in FIG. 6 is a simple 2-D table, but it should be noted that multiples vectors (forming matrices) are typically used to represent large datasets. Referring back to FIG. 4, each category of data determined in the process flow could be represented by a separate vector (column) in a tabular dataset depending on how the data is aggregated.

After the dataset is aggregated, process 500 scrubs the dataset (step 504). Very large datasets, sometimes referred to as big data, often contain noise and complicated data structures. Bordering on the order of petabytes, such datasets comprise a variety, volume, and velocity (rate of change) that defies conventional processing and is impossible for a human to process without advanced machine assistance. Scrubbing refers to the process of refining the dataset before using it to build a predictive model and includes modifying and/or removing incomplete data or data with little predictive value. It can also entail converting text-based data into numerical values (one-hot encoding) or convert numerical values into a category.

In calculating the opportunity index, the initial data set can be restricted in several ways. In one illustrative example, sufficient data must exist in order to create the initial hierarchical structure of a given firm, which is the basis for determining the other HR metrics. In one illustrative example, firms must exist in the sample data in consecutively measured time periods, i.e. years, in order to identify promotion activity and calculate year-over-year firm employment growth. In one illustrative example, firms must have more than a threshold number of employees available in the sample and have non-missing values for each of the metrics used in calculation of the index.

In one illustrative example, process 500 divides the data into training data and test data to be used for building and testing the predictive model (step 506). To produce optimal results, the same data that is used to test the model should not be the same data used for training. The data is divided by rows, with 70-80% used for training and 20-30% used for testing. Randomizing the selection of the rows avoids bias in the model. In an alternative example that only observes and analyzes the relationship of the index with turnover, all of the sample data may be used to generate the linear regression model equation.

Process 500 then performs iterative analysis on the training data by applying predictive algorithms to construct a predictive model (step 508). There are three main categories of machine learning: supervised, unsupervised, and reinforcement. Supervised machine learning comprises providing the machine with test data and the correct output value of the data. Referring back to table 600 in FIG. 6, during supervised learning, the values for the y column (output) are provided along with the training data (labeled dataset) for the model building process in step 508. The algorithm, through trial and error, deciphers the patterns that exist between the input training data and the known output values to create a model that can reproduce the same underlying rules with new data. Examples of supervised learning algorithms include regression analysis, decisions trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data no one previously knew existed. Examples of algorithms used in unsupervised machine learning include k-means clustering (k-NN), association analysis, and descending clustering.

The goal of the growth potential index is to measure and quantify the metrics within a firm which convey opportunity to employees and, therefore, work to reduce voluntary turnover. In one illustrative example, the index is calculated as a weighted average of the values where in the initial specification each metric is given equal weight:

$$\text{Opportunity } Index_i = \frac{\sum_{j=1}^{n} z_{ij}}{n} \qquad \text{Equation 2}$$

wherein:

n is the number of metrics included in the index calculation.

As illustrated in FIG. 7, the initial index scores are developed from the raw metrics by standardizing the values and applying equal weights. In one illustrative example, the initial scores are centered at the mean values, giving the overall index value of zero. Positive or negative deviations from zero represent the number of standard deviations above or below the average that an industry falls. In another illustrative example, the index values can also be converted to a more common index framework with the average centered at a value other than zero, such as 100.

Although starting with the assumption that each metric is equally important, this assumption can be modified through iterative analysis. For example, a linear regression model can help to uncover which, if any, of the preferred metrics are most correlated with low levels of employee turnover. FIG. 8 illustrates a linear regression model wherein standardized values for different opportunity metrics are included as independent variables.

In the example of FIG. 8, the model confirms that each of the included metrics are statistically significantly and negatively correlated with voluntary turnover within a firm. The results show that the manager/employee ratio and promotion rate are about twice as important in determining turnover as employment growth. Based on the results of this analysis, the index can be iteratively recalibrated. For example, the model illustrated in FIG. 8 can be recalibrated using the following weighting structure: manager/employee ratio (40%), and promotion rate (40%), employment growth (20%).

Returning to FIG. 5, after the model is constructed, the test data is fed into the model to test its accuracy (step 510). In an embodiment, the model is tested using mean absolute error, which examines each prediction in the model and provides an average error score for each prediction. If the error rate between the training and test dataset is below a predetermined threshold, the model has learned the dataset's pattern and passed the test.

Figure 9:
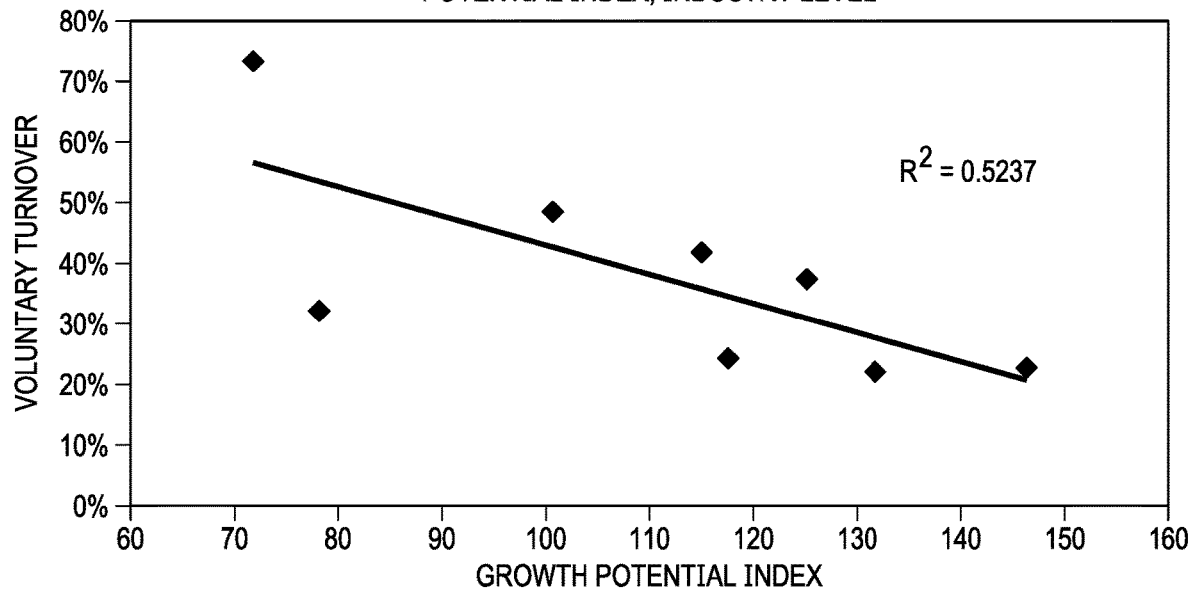
FIG. 9 is a negative relationship between a growth potential index and voluntary turnover rate at both an industry level and a firm level in accordance with an illustrative embodiment.
Figure 10:
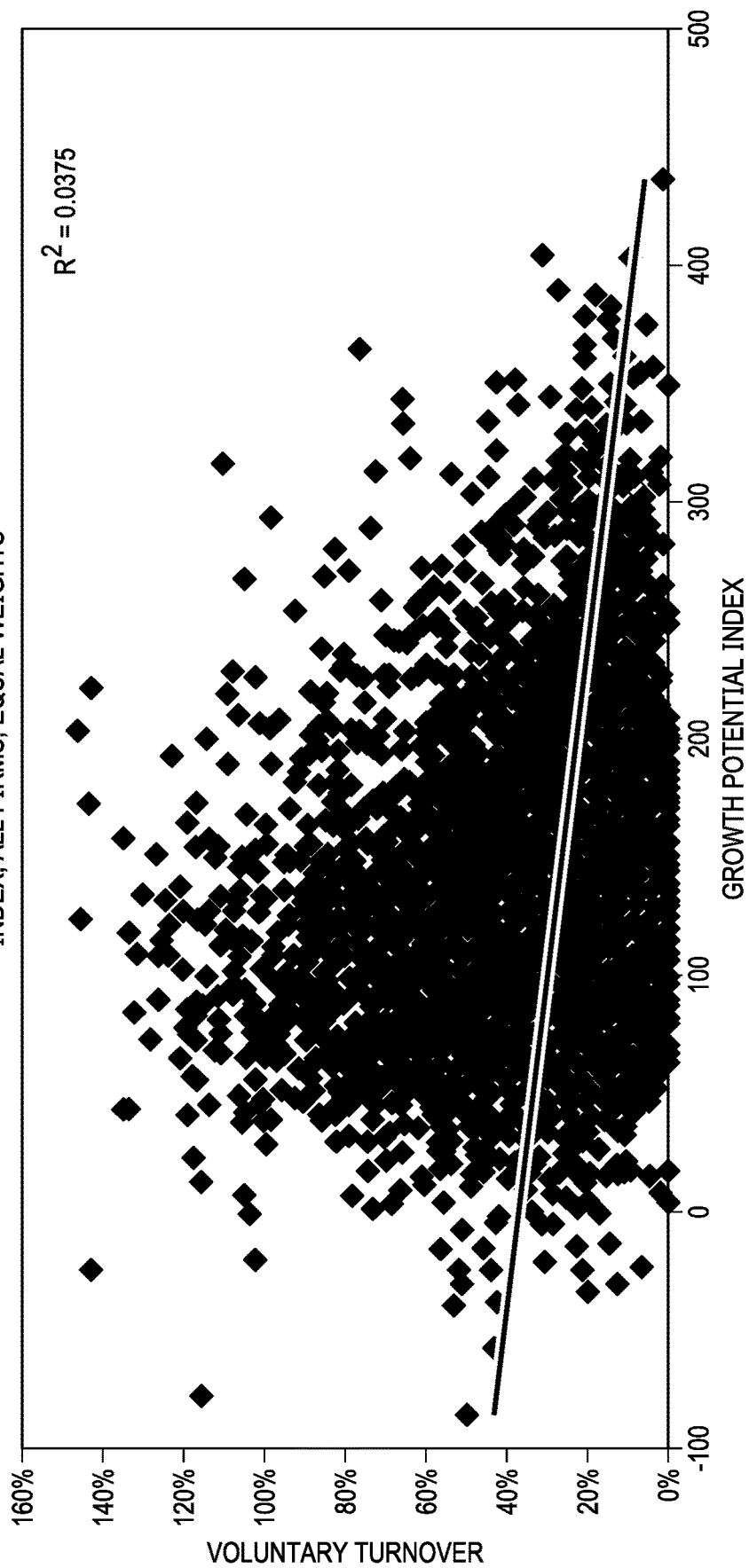
FIG. 10 is a negative relationship between a growth potential index and voluntary turnover rate at both an industry level and a firm level in accordance with an illustrative embodiment.

In one illustrative example, the values for each industry are compared against the voluntary turnover rate within the same industry to test the consistency and usefulness of the calculated growth potential index. As illustrated in FIGS. 9 & 10, there is a strong, negative relationship between the growth potential index and voluntary turnover rate at both the industry level (FIG. 9) and the firm level (FIG. 10).

If the model fails the test, the hyperparameters of the model are changed and/or the training and test data are re-randomized, and the iterative analysis of the training data is repeated (step 512). Hyperparameters are the settings of the algorithm that control how fast the model learns patterns and which patterns to identify and analyze. Once a model has passed the test stage, it is ready for application.

Whereas supervised and unsupervised learning reach an endpoint after a predictive model is constructed and passes the test in step 510, reinforcement learning continuously improves its model using feedback from the application as applied to new empirical data. Algorithms such as Q-learning are used to train the predictive model through continuous learning using measurable performance criteria (discussed in more detail below).

After the model is constructed and tested for accuracy, process 500 uses the model to calculate predicted voluntary employee turnover based on metrics associated with employee growth opportunity (step 514).

The predicted voluntary employee turnover is then converted into a percentage of observed employee turnover to form an index (step 516). The index is calculated by dividing the observed value by the predicted value and then multiplying by 100. A percentage greater than 100% identifies employers that have greater employee turnover (i.e. less turnover) than most employers with similar employee growth opportunities. A percentage less than 100% identifies employers that have lower employee turnover (i.e. greater turnover/loss) than most employers with similar employee growth opportunities. The indices of turnover serve as indirect metrics of employee growth opportunities and can be used to compare an employer to a peer group.

Figure 11:
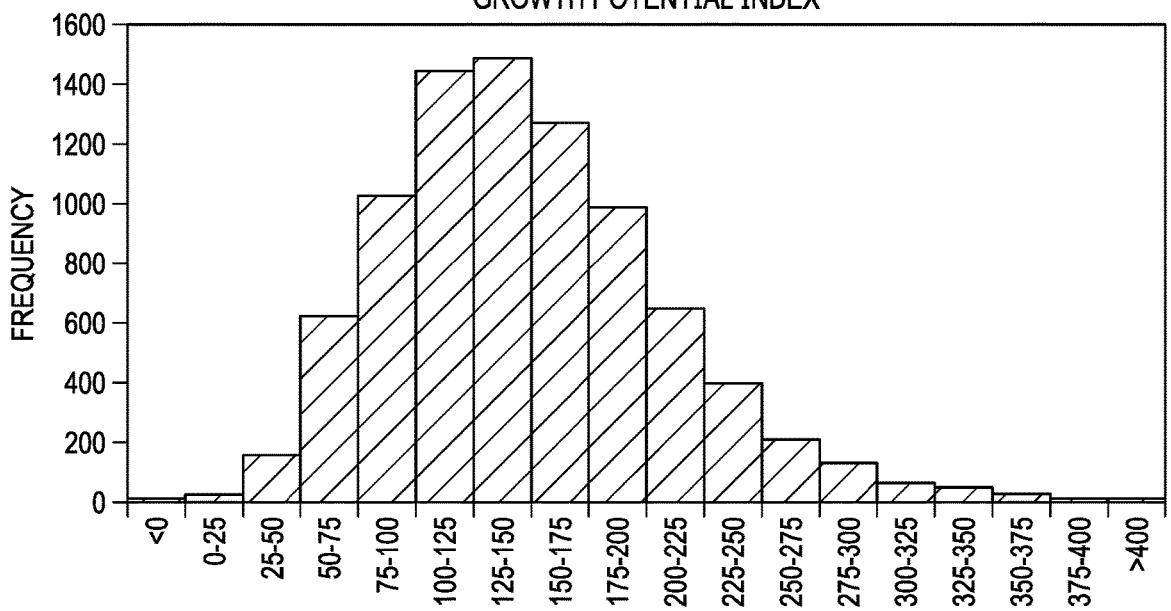
FIG. 11 is distribution of index values across all firms in a sample in accordance with an illustrative embodiment.

For example, FIG. 11 illustrates the growth potential index as a distribution of index values across all firms in the sample. The distribution is right-skewed, with a relatively small number of firms exhibiting extremely high index scores. In one illustrative example, firms toward the bottom end of the distribution may share a commonality in that they are weighed down by negative employment growth.

After the indices have been calculated, they are used to rank order employers (step 518). Rank ordering allows peer group comparison between employers in order to optimize employee growth opportunity in mitigating voluntary employee turnover.

If reinforcement learning is used with the predictive modeling, the employee turnover rankings are compared to the actual observed employee turnover over a subsequent time period (e.g., month, quarter, year, etc.) (step 520). The actual employee turnover for the employers in question might not conform as expected to the relative index rankings. Furthermore, the sample data used to construct the predictive model might become outdated. Updated employee growth opportunity metrics are voluntary employee turnover data that is collected after the subsequent time period and fed back into the machine learning to update and modify the predictive model (step 522).

The illustrative embodiments thus produce the technical effect of constructing accurate, complex predictive models from large datasets and do so in a timely manner in the face of rapidly changing empirical data.

Figure 12:
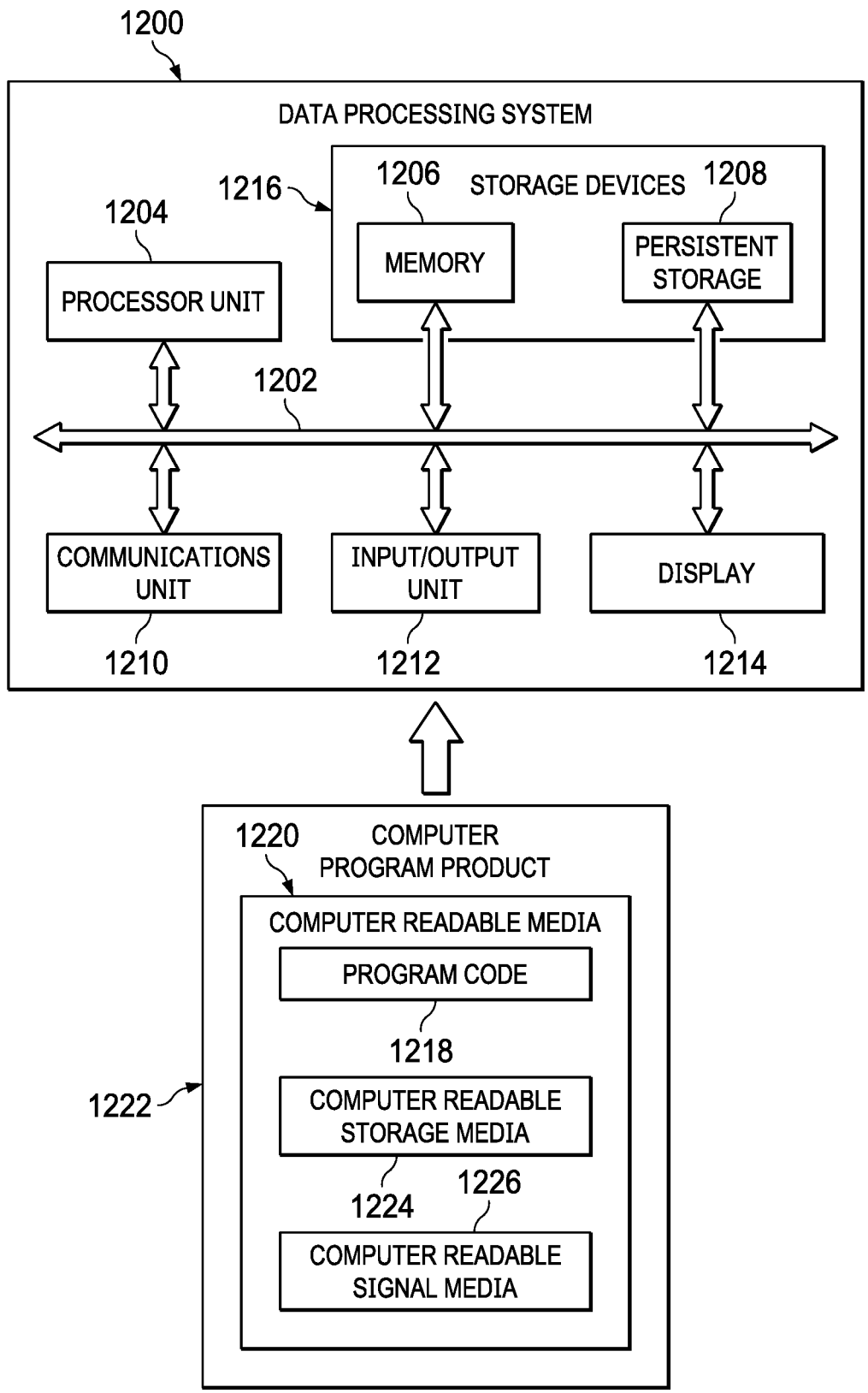
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement one or more computers and client computer system 112 in FIG. 1. In this illustrative example, data processing system 1200 includes communications framework 1202, which provides communications between processor unit 1204, memory 1206, persistent storage 1208, communications unit 1210, input/output unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation. In an embodiment, processor unit 1204 comprises one or more conventional general purpose central processing units (CPUs). In an alternate embodiment, processor unit 1204 comprises one or more graphical processing units (CPUs).

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1216, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208. Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 600 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218. Alternatively, program code 1218 may be transferred to data processing system 1200 using computer-readable signal media 1226.

Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for predictive modeling, the method comprising:
aggregating, by one or more processors, sample data regarding a plurality of metrics associated with employee growth opportunity and voluntary employee turnover, wherein the sample data is specific to employers that use dynamic predictive modeling of employee satisfaction and retention;
scrubbing, by one or more processors, sample data by removing incomplete data or data with little predictive value;
performing, by one or more processors, iterative analysis based on machine learning with a training data split from the sample data to construct a predictive model, wherein the machine learning comprises at least one of supervised learning, unsupervised learning, and reinforcement learning;
testing an accuracy of the predictive model with a test data split from the sample data;
in response to an error rate above a predetermined threshold between the training and test data that is determined after the testing:
controlling, by one or more processor, how fast the model learns patterns and which patterns to identify and analyze by changing one or more hyper-parameters of the predictive model;
randomizing, by one or more processors, a selection by rows of both the training data and the test data;
repeating, by one or more processors, the iterative analysis based on the machine learning with the training data to construct the predictive model; and
re-testing, by one or more processor, the accuracy of the predictive model;
determining, by one or more processors using the predictive model, for each individual of a plurality of individuals, a predicted voluntary employee turnover for each individual based on metrics associated with employee growth opportunity;
converting, by one or more processors, the predicted voluntary employee turnover for a plurality of selected employers into an index of voluntary employee turnover based on the predicted voluntary employee turnover relative to an observed voluntary employee turnover for employers with similar employee growth opportunities; and
rank ordering, by one or more processors, the plurality of selected employers according to the index of voluntary employee turnover for each employer.

2. The method according to claim 1, further comprising:
comparing, by one or more processors, the rank ordering of voluntary employee turnover for the selected group of employers to observed voluntary employee turnover for said employers over a second specified time period;
aggregating, by one or more processors, updated sample data over the second specified time period; and
updating, by one or more processors, the predictive model using machine learning incorporating the updated sample data for the second specified time period.

3. The method according to claim 1, wherein categories of data applied to the machine learning predictive modeling include at least one of:
industry/sector for the selected group of employers;

employment growth within the selected group of employers;

manager-to-employee ratio within the selected group of employers;

promotion rate within the selected group of employers; and promotion wage growth within the selected group of employers.

4. The method according to claim 1, wherein the selected group of employers are selected according to industry/sector.

5. The method according to claim 1, wherein the machine learning uses supervised learning to construct the predictive model.

6. The method according to claim 1, wherein the machine learning uses unsupervised learning to construct the predictive model.

7. The method according to claim 1, wherein the machine learning uses reinforcement learning to construct the predictive model.

8. A machine learning predictive modeling system, comprising:
  a computer system;
  one or more processors running on the computer system, wherein the one or more processors are configured to execute program instructions to cause the computer system to:
  aggregate sample data regarding a plurality of metrics associated with employee growth opportunity and voluntary employee turnover, wherein the sample data is specific to employers that use dynamic predictive modeling of employee satisfaction and retention;
  scrub sample data by removing incomplete data or data with little predictive value;
  perform iterative analysis based on machine learning with a training data split from the sample data to construct a predictive model, wherein the machine learning comprises at least one of supervised learning, unsupervised learning, and reinforcement learning;
  test an accuracy of the predictive model with a test data split from the sample data;
  in response to an error rate above a predetermined threshold between the training and test data that is determined after the testing:
    control how fast the model learns patterns and which patterns to identify and analyze by changing one or more hyper-parameters of the predictive model;
    randomize the training data and the test data;
    repeat the iterative analysis based on the machine learning with the training data to construct the predictive model; and
    re-test the accuracy of the predictive model;
  determine, using predictive model, for each individual of a plurality of individuals, a predicted voluntary employee turnover for each individual based on metrics associated with employee growth opportunity;
  convert the predicted voluntary employee turnover for a plurality of selected employers into an index of voluntary employee turnover based on the predicted voluntary employee turnover relative to an observed voluntary employee turnover for employers with similar employee growth opportunities; and
  rank order the plurality of selected employers according to the index of voluntary employee turnover for each employer.

9. The machine learning predictive modeling system according to claim 8, wherein the one or more processors running on the computer system compare the rank ordering of employee turnover for the selected group of employers to observed employee turnover for said employers over a second specified time period; aggregate updated sample data over the second specified time period; and update the predictive model using machine learning incorporating the updated sample data for the second specified time period.

10. The machine learning predictive modeling system according to claim 8, wherein the one or more processors comprise aggregated graphical processor units (GPU).

11. The machine learning predictive modeling system according to claim 8, wherein the machine learning uses supervised learning to construct the predictive model.

12. The machine learning predictive modeling system according to claim 8, wherein the machine learning uses unsupervised learning to construct the predictive model.

13. The machine learning predictive modeling system according to claim 8, wherein the machine learning uses reinforcement learning to construct the predictive model.

14. A computer program product for machine learning predictive modeling, the computer program product comprising:
  a non-transitory computer-readable storage media having program instructions embodied thereon to perform the steps of:
    aggregating sample data regarding a plurality of metrics associated with employee growth opportunity and voluntary employee turnover, wherein the sample data is specific to employers that use dynamic predictive modeling of employee satisfaction and retention;
    scrubbing sample data by removing incomplete data or data with little predictive value;
    performing iterative analysis based on machine learning with a training data split from the sample data to construct a predictive model, wherein the machine learning comprises at least one supervised learning, unsupervised learning, and reinforcement learning;
    testing an accuracy of the predictive model with a test data split from the sample data,
    in response to an error rate above a predetermined threshold between the training and test data that is determined after the testing:
      controlling, by one or more processor, how fast the model learns patterns and which patterns to identify and analyze by changing one or more hyper-parameters of the predictive model;
      controlling, by one or more processor, how fast the model learns patterns and which patterns to identify and analyze by changing one or more hyper-parameters of the predictive model;
      controlling, by one or more processor, how fast the model learns patterns and which patterns to identify and analyze by changing one or more hyper-parameters of the predictive model;
      randomizing the training data and the test data;
      repeating the iterative analysis based on the machine learning with the training data to construct the predictive model; and
      re-testing the accuracy of the predictive model;
    determining, using predictive model, for each individual of a plurality of individuals, a predicted voluntary employee turnover for each individual based on metrics associated with employee growth opportunity;
    converting the predicted voluntary employee turnover for a plurality of selected employers into an index of voluntary employee turnover based on the predicted voluntary employee turnover relative to an observed voluntary employee turnover for employers with similar employee growth opportunities; and ranking the plurality of selected employers according to the index of voluntary employee turnover for each employer.

15. The computer program product according to claim 14, further comprising instructions for:

comparing the rank ordering of employee turnover for the selected group of employers to observed employee turnover for said employers over a second specified time period;

aggregating updated sample data over the second specified time period; and updating the predictive model using machine learning incorporating the updated sample data for the second specified time period.

16. The computer program product according to claim 14, wherein categories of data applied to the machine learning predictive modeling include at least one of:

industry/sector for the selected group of employers;

employment growth within the selected group of employers;

manager-to-employee ratio within the selected group of employers;

promotion rate within the selected group of employers; and promotion wage growth within the selected group of employers.

17. The computer program product according to claim 14, wherein the selected group of employers are selected according to industry/sector.

18. The computer program product according to claim 14, wherein the machine learning uses supervised learning to construct the predictive model.

19. The computer program product according to claim 14, wherein the machine learning uses unsupervised learning to construct the predictive model.

20. The computer program product according to claim 14, wherein the machine learning uses reinforcement learning to construct the predictive model.

\* \* \* \* \*